US012311707B2

(12) United States Patent
Parr

(10) Patent No.: US 12,311,707 B2
(45) Date of Patent: May 27, 2025

(54) NON-PNEUMATIC TIRE HAVING COVERS

(71) Applicant: Bridgestone Americas Tire Operations, LLC, Nashville, TN (US)

(72) Inventor: Richard S. Parr, Canton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 416 days.

(21) Appl. No.: 17/783,817

(22) PCT Filed: Nov. 16, 2020

(86) PCT No.: PCT/US2020/060737
§ 371 (c)(1),
(2) Date: Jun. 9, 2022

(87) PCT Pub. No.: WO2021/137958
PCT Pub. Date: Jul. 8, 2021

(65) Prior Publication Data
US 2023/0010163 A1    Jan. 12, 2023

Related U.S. Application Data

(60) Provisional application No. 62/954,764, filed on Dec. 30, 2019.

(51) Int. Cl.
*B60C 7/14* (2006.01)
*B60B 7/06* (2006.01)
(Continued)

(52) U.S. Cl.
CPC .............. *B60C 7/146* (2021.08); *B60B 7/063* (2013.01); *B60B 9/04* (2013.01); *B60B 9/26* (2013.01); *B60C 7/107* (2021.08); *B60C 7/143* (2013.01)

(58) Field of Classification Search
CPC ........... B60C 7/107; B60C 7/14; B60C 7/146; B60B 7/04; B60B 7/063; B60B 9/26; B60B 9/04
See application file for complete search history.

(56) References Cited

U.S. PATENT DOCUMENTS

| 1,424,223 A | | 8/1922 | Wagner | |
|---|---|---|---|---|
| 4,945,962 A | * | 8/1990 | Pajtas | ..................... B60C 7/107 152/7 |

(Continued)

FOREIGN PATENT DOCUMENTS

| JP | 06-036901 | 5/1994 |
|---|---|---|
| JP | 2007-030861 | 2/2007 |

(Continued)

OTHER PUBLICATIONS

International Search Report & Written Opinion; Corresponding PCT Application Serial No. PCT/US2020/060737; Authorized Officer Bahng, Seung Hoon; Mar. 2, 2021.
(Continued)

*Primary Examiner* — Jason R Bellinger
(74) *Attorney, Agent, or Firm* — Shaun J. Fox; Bryan J. Jaketic

(57) ABSTRACT

A non-pneumatic tire includes a lower ring having a first diameter and an upper ring having a second diameter greater than the first diameter. The upper ring is substantially coaxial with the lower ring. The non-pneumatic tire further includes support structure extending between the lower ring and the upper ring. The non-pneumatic tire also includes a flexible cover having an annulus shape that covers at least a portion of a first side of the support structure, wherein a lower portion of the flexible cover includes a circumferential projection that projects axially outward relative to a region above the circumferential projection.

19 Claims, 13 Drawing Sheets

(51) Int. Cl.
  *B60B 9/04* (2006.01)
  *B60B 9/26* (2006.01)
  *B60C 7/10* (2006.01)

(56) References Cited

U.S. PATENT DOCUMENTS

| | | | | |
|---|---|---|---|---|
| 6,688,703 | B1 * | 2/2004 | Wang | B60B 7/12 |
| | | | | 301/37.23 |
| 10,434,819 | B2 * | 10/2019 | Renson | B60B 7/0026 |
| 10,749,242 | B2 * | 8/2020 | Fenkanyn | H01Q 1/2241 |
| 11,021,010 | B2 * | 6/2021 | Nylund | B60B 7/01 |
| 11,772,416 | B2 * | 10/2023 | Sigler | B60B 9/26 |
| | | | | 152/5 |
| 2012/0038206 | A1 | 2/2012 | Chadwick et al. | |
| 2015/0328924 | A1 * | 11/2015 | Renson | B60B 7/14 |
| | | | | 301/37.26 |
| 2017/0368879 | A1 * | 12/2017 | Lettieri | B60C 7/22 |

FOREIGN PATENT DOCUMENTS

| | | |
|---|---|---|
| KR | 20-1998-0007106 | 4/1998 |
| KR | 20140028473 | 3/2014 |
| KR | 10-1393891 | 5/2014 |

OTHER PUBLICATIONS

Supplementary European Search Report; Corresponding EP Application Serial No. 20909980; Dec. 13, 2023.

* cited by examiner

NON-PNEUMATIC TIRE HAVING COVERS

CROSS-REFERENCE TO RELATED APPLICATIONS

This application is a national stage application, filed under 35 U.S.C. § 371, of International Patent Application No. PCT/US2020/060737, filed on Nov. 16, 2020, which in turn claims priority to U.S. Provisional Patent Application No. 62/954,764, filed on Dec. 30, 2019. Both of these documents are incorporated by reference herein in their entirety.

FIELD OF INVENTION

The present disclosure relates to non-pneumatic tires having covers. More particularly, the present disclosure relates to non-pneumatic tires having two-piece covers.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects a lower ring to an upper ring.

SUMMARY OF THE INVENTION

In one embodiment, a non-pneumatic tire, rim, and cover assembly is provided. The assembly includes a non-pneumatic tire having a lower ring with a first diameter and an upper ring with a second diameter greater than the first diameter. The upper ring is substantially coaxial with the lower ring. The non-pneumatic tire also includes support structure extending between the lower ring and the upper ring. The assembly further includes a rim connected to the lower ring of the non-pneumatic tire. The assembly also includes an upper cover connected to a first side of the non-pneumatic tire. The upper cover has an annulus shape that covers at least a portion of the support structure. A lower portion of the upper cover includes a circumferential projection that projects axially outward relative to a region above the circumferential projection. The assembly further includes a lower cover connected to the upper cover. The lower cover has a circumferential groove disposed on a rear surface that receives the circumferential projection of the upper cover.

In another embodiment, a method of covering a side of a non-pneumatic tire is provided. The method includes providing a non-pneumatic tire having a lower ring with a first diameter and an upper ring with a second diameter greater than the first diameter. The upper ring is substantially coaxial with the lower ring. The non-pneumatic tire also has support structure extending between the lower ring and the upper ring. The method further includes providing a rim and mounting the non-pneumatic tire on the rim. The method also includes providing an upper cover having an annulus shape and connecting the upper cover to the non-pneumatic tire. The upper cover has a lower circumferential projection that projects axially outward relative to a region above the lower circumferential projection. The method further includes providing a lower cover having a circumferential groove disposed on a rear surface, and attaching the lower cover onto the upper cover by inserting the lower circumferential projection of the upper cover into the circumferential groove of the lower cover.

In yet another embodiment, a non-pneumatic tire having a cover is provided. The non-pneumatic tire includes a lower ring having a first diameter and an upper ring having a second diameter greater than the first diameter. The upper ring is substantially coaxial with the lower ring. The non-pneumatic tire further includes support structure extending between the lower ring and the upper ring. The non-pneumatic tire also includes a flexible cover having an annulus shape that covers at least a portion of a first side of the support structure, wherein a lower portion of the flexible cover includes a circumferential projection that projects axially outward relative to a region above the circumferential projection.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Tread" as used herein, refers to that portion of the tire that comes into contact with the road or ground under normal inflation and normal load.

While similar terms used in the following descriptions describe common tire components, it should be understood that because the terms carry slightly different connotations, one of ordinary skill in the art would not consider any one of the following terms to be purely interchangeable with another term used to describe a common tire component.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread surface than the "lower" or "bottom" element. Additionally, when relative directional terms such as "above" or "below" are used in connection with an element, an element that is "above" another element is closer to the tread surface than the other element.

The terms "inward" and "inwardly" refer to a general direction towards the equatorial plane of the tire, whereas "outward" and "outwardly" refer to a general direction away from the equatorial plane of the tire and towards the side of the tire. Thus, when relative directional terms such as "inner" and "outer" are used in connection with an element, the "inner" element is spaced closer to the equatorial plane of the tire than the "outer" element.

Figure 1:
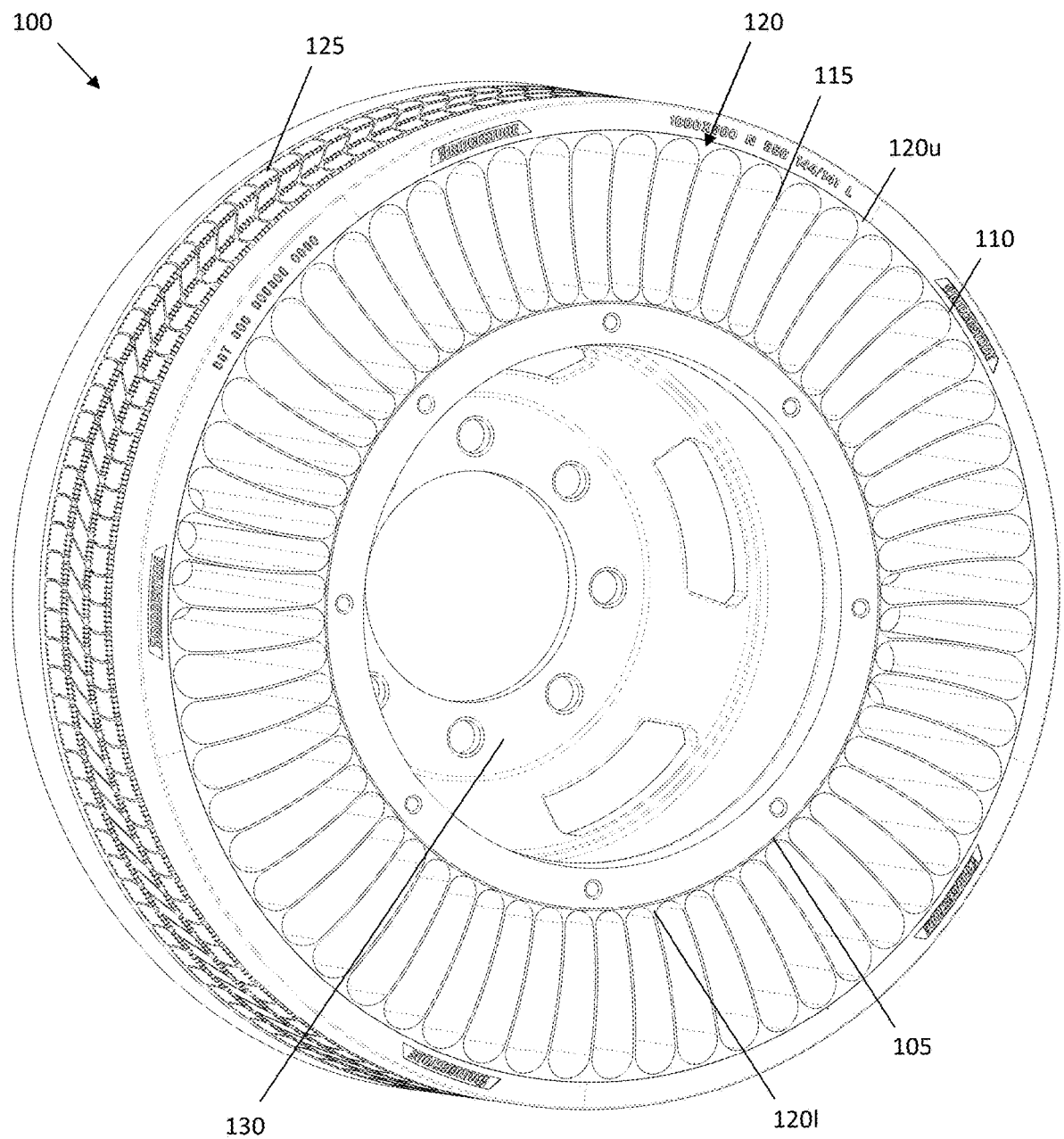
FIG. 1 is a perspective view of one embodiment of a non-pneumatic tire and rim assembly.

FIG. 1 is a perspective view of one embodiment of a non-pneumatic tire and rim assembly. The assembly includes a non-pneumatic tire 100 having a lower ring 105 with a first diameter and an upper ring 110 having a second diameter greater than the first diameter. The upper ring 110 is substantially coaxial with the lower ring 105. A plurality of spokes 115 extend between the lower ring 105 and the upper ring 110.

A plurality of fillets 120 are disposed between the lower ring 105 and the upper ring 110 at the end of each spoke 115. The plurality of fillets 120 includes lower fillets $120_l$ and upper fillets $120_u$. The lower fillets $120_l$ are in direct contact with the lower ring 115. The upper fillets $120_u$ are in direct contact with the upper ring 110. In an alternative embodiment, the fillets may be omitted.

In an alternative embodiment (not shown) a plurality of ears may be disposed between pairs of adjacent spokes. Each ear includes an aperture. The aperture may be a threaded aperture or a smooth aperture. In an alternative embodiment, the ears may be omitted. In another alternative embodiment, a webbing or other support structure may be employed instead of spokes.

A circumferential tread 125 is disposed about the upper ring 110 in the illustrated embodiment. The tread 125 may include tread elements such as grooves, ribs, blocks, lugs, sipes, studs, and other elements. A shear band or other shear element or reinforcement structure (not shown) may be disposed between the upper ring 110 and the tread 125. In an alternative embodiment (not shown), the separate tread may be omitted and instead tread elements may be formed directly on the upper ring.

The lower and upper rings 105, 110 may be constructed of a polymeric material, such as natural or synthetic rubber, or other elastomeric material. Alternatively, the lower and upper rings 105, 110 may be constructed of a harder polymeric material such as polyurethane, polyester, nylon, or polyvinyl chloride (PVC). The spokes 115 may be constructed of elastomeric material having a single layer of reinforcement disposed therein. The tread 125 and fillets 120 may be constructed of an elastomeric material, such as natural or synthetic rubber, or other elastomeric material.

The assembly further includes a wheel 130. The lower ring 105 is attached to the rim 130, such as by an adhesive or a chemical bonding process. The wheel 130 may be attached to a vehicle through a plurality of bolts (not shown).

Figure 2:
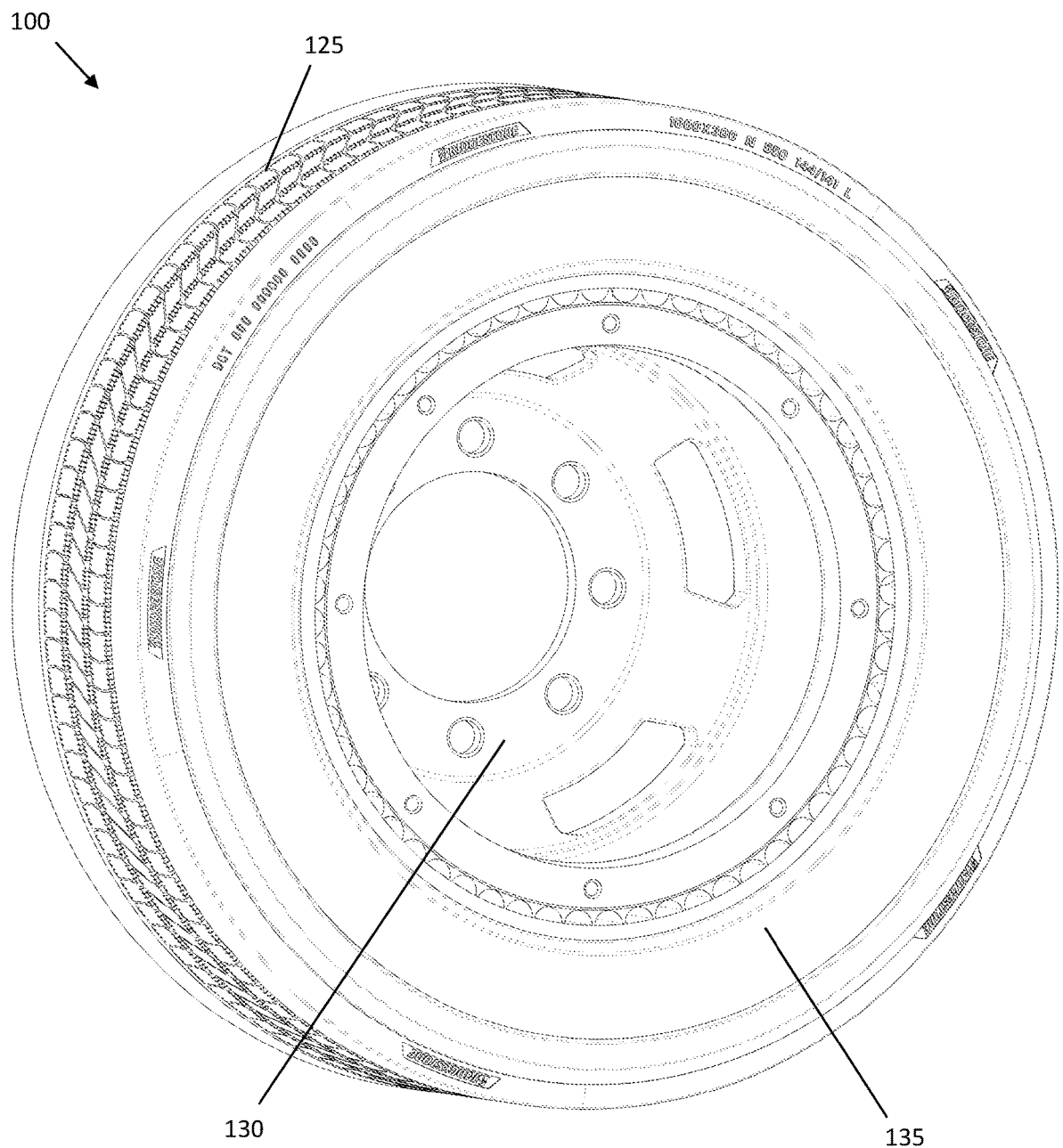
FIG. 2 is a partial perspective view of the non-pneumatic tire and rim assembly having an upper cover.

FIG. 2 is a perspective view of the non-pneumatic tire and rim assembly having an upper cover 135. The upper cover 135 may also be simply referred to as the cover. In the illustrated embodiment, the upper cover 135 has an annulus shape that covers a portion of a first side of the non-pneumatic tire 100. Specifically, the upper cover 135 covers a portion of the spokes 115. The upper cover 135 has an inner diameter that is greater than the diameter of the lower ring 105. In the illustrated embodiment, the upper fillets $120_u$ and upper portions of the spokes 115 are covered by the upper cover 135, while the lower ring 105, the lower fillets $120_l$, and lower portions of the spokes 115 are uncovered. In an alternative embodiment (not shown), the upper cover is dimensioned to cover the upper fillets, the spokes, the lower fillets, and the lower ring.

In one embodiment, the upper ring 110 is covered by the upper cover 135. In other words, the outer diameter of the upper cover 135 is greater than the diameter of the upper ring 110. In an alternative embodiment, the upper ring 110 is uncovered. In other words, the outer diameter of the upper cover 135 is less than the diameter of the upper ring 110. Similarly, in one embodiment, a shoulder region of the tread 125 is covered by the cover 135, while in an alternative embodiment the shoulder region of the tread 125 is uncovered.

Figure 3:
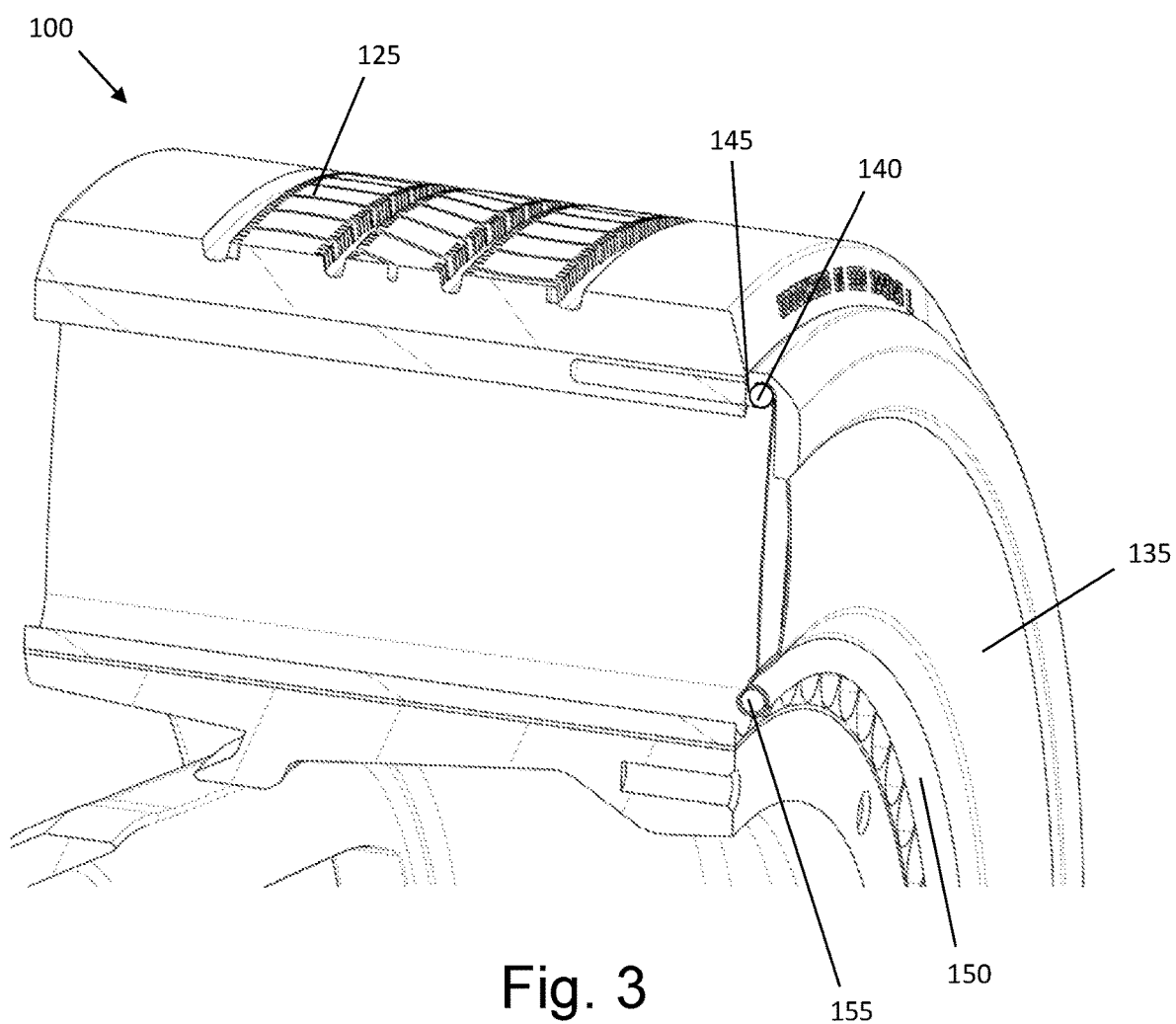
FIG. 3 is a cross-sectional view of the non-pneumatic tire and rim assembly having an upper cover as shown in FIG. 2.

FIG. 3 is a partial cross-sectional view of the non-pneumatic tire and rim assembly having an upper cover as shown in FIG. 2. In the illustrated embodiment, a circular wire 140 is attached to the non-pneumatic tire 100 at a plurality of locations. In one embodiment, the circular wire 140 is connected to the upper ring 110. In an alternative embodiment, the circular wire 140 is connected to the spokes 115. In another alternative embodiment, the circular wire 140 is connected to the tread 125, such as at a shoulder portion of the tread.

The upper cover 135 is attached to the circular wire 140. In the illustrated embodiment, the upper cover includes a recess defined by a hook-shaped component 145 at the top of the cover 135. The hook-shaped component may extend circumferentially about the entire upper cover 145, or it may take the form of a series of hooks spaced about the upper cover. In one embodiment, at least one of the upper cover 135 and the circular wire 145 is a flexible component, allowing the upper cover 135 to snap onto the circular wire 145. In one embodiment, the upper cover 135 is sufficiently flexible to accommodate a vertical displacement of the tread 125 of between 0.5 inches to 2 inches (1-5 cm). For example, the upper cover 135 may be constructed of fiberglass, plastic, fabric, aramid, rubber, or other flexible material. The upper cover may be formed as a mesh, or include a plurality of apertures to increase flexibility.

In an alternative embodiment (not shown), the upper cover is directly attached to the non-pneumatic tire at a plurality of locations. For example, the upper cover may be bolted to the non-pneumatic tire or attached with removable fasteners, such as clips. In another alternative embodiment, the upper cover may be permanently attached to the non-pneumatic tire by adhesive or permanent fasteners.

As can be seen in FIG. 3, a lower portion of the upper cover 135 includes a circumferential projection 150 that projects axially outward relative to a region above the circumferential projection. In the illustrated embodiment, the circumferential projection 150 of the upper cover 135 is defined by a lower circular wire 155. In an alternative embodiment, the circumferential projection may be molded into the upper cover 135. The circumferential projection may be a continuous projection, or may be defined by a plurality of spaced-apart projections.

Figure 4:
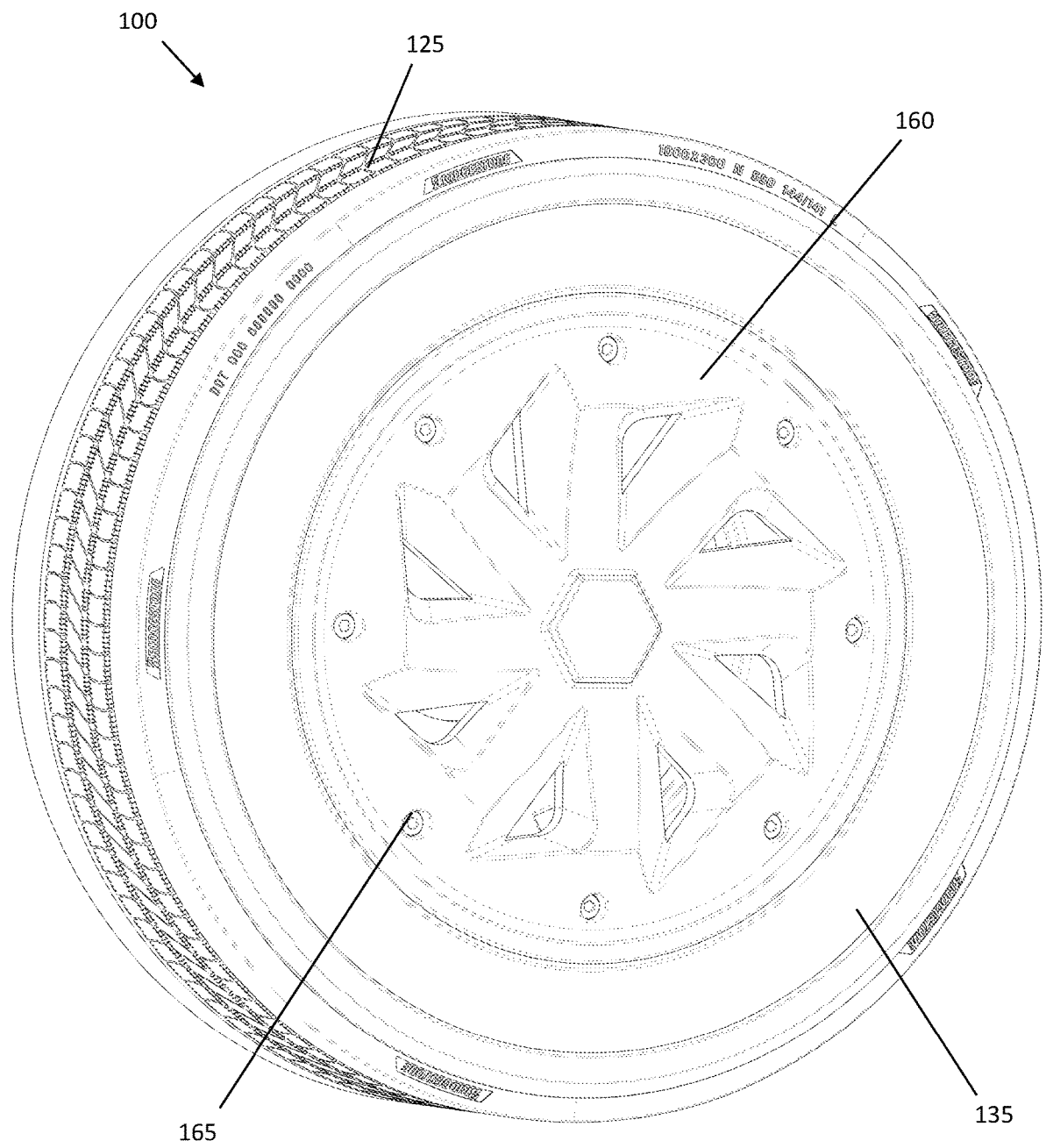
FIG. 4 is a perspective view of the non-pneumatic tire and rim assembly having an upper cover and a lower cover.

FIG. 4 is a partial perspective view of the non-pneumatic tire and rim assembly having the upper cover 135 and a lower cover 160 that covers a portion of a first side of the non-pneumatic tire 100. In the illustrated embodiment, the lower cover 160 is a circular disk that covers a first side of the lower ring 105, the lower fillets 1201 and a lower portion of the spokes 115, as well as the wheel 130. It should be understood, however, that the upper and lower covers 135, 160 may be sized to cover different components of the non-pneumatic tire 100. In an alternative embodiment, the lower cover is an annulus.

In one embodiment, the lower cover 160 is a rigid component constructed of a rigid material, such as metal, polyethylene, polypropylene, glass-filled plastic, or other plastic. In an alternative embodiment, the lower cover may be flexible.

In the illustrated embodiment, the lower cover 160 is attached to the rim wheel 130 at a plurality of locations by bolts 165. Thus, the lower cover 160 is removeably attached to the non-pneumatic tire and rim assembly. In alternative embodiments, other removable fasteners may be employed. In another alternative embodiment, the lower cover may be permanently attached to the non-pneumatic tire and rim assembly by adhesive or permanent fasteners.

While the illustrated embodiment shows the lower cover 160 as being attached to rim wheel 130, it should be understood that the lower cover may be attached at other locations. For example, the lower cover may be attached to the non-pneumatic tire at the lower ring, the lower fillets, or the spokes or other support structure.

Figure 5:
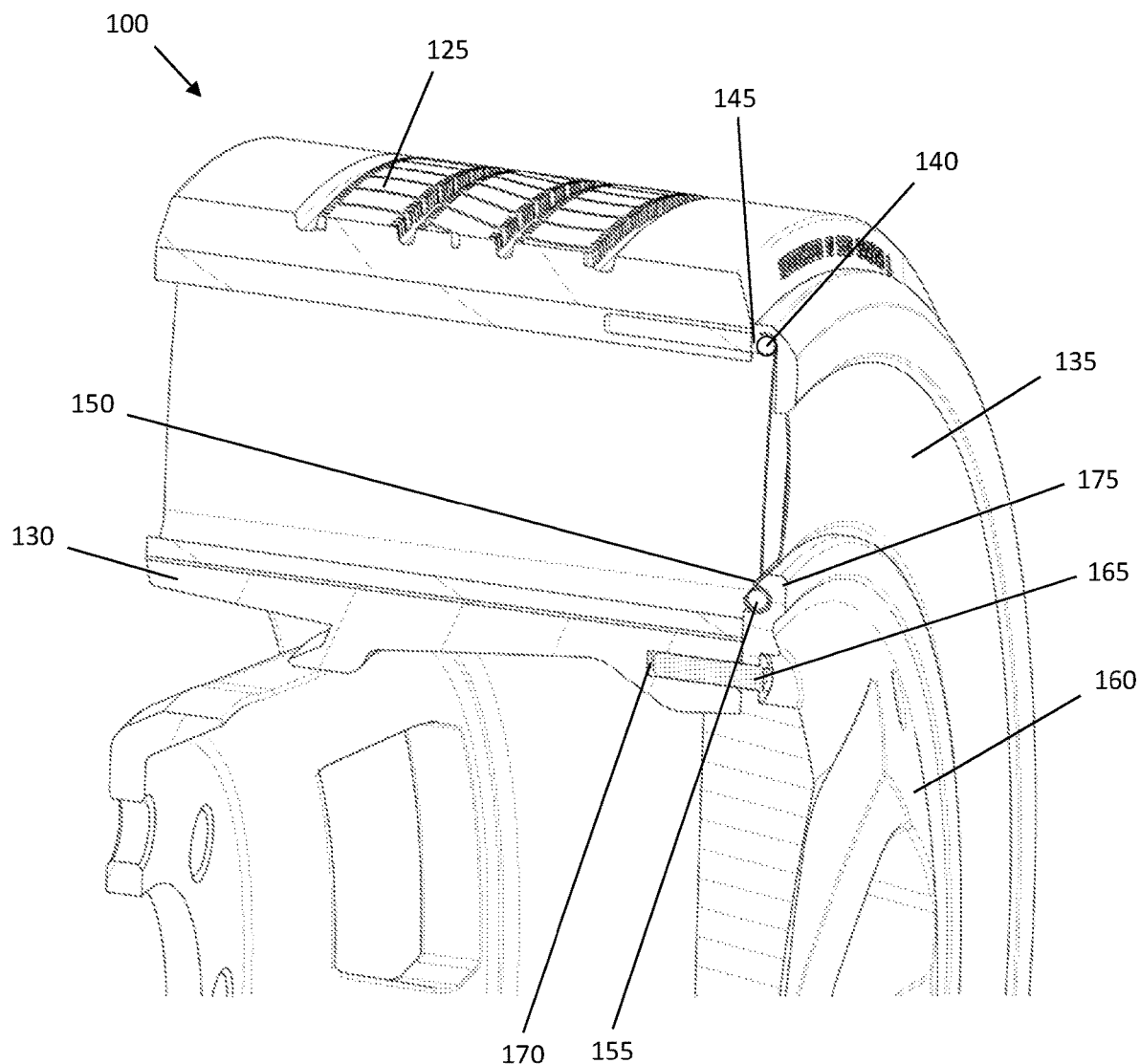
FIG. 5 is a partial cross-sectional view of the non-pneumatic tire and rim assembly having an upper cover and a lower cover as shown in FIG. 4.

FIG. 5 is a partial cross-sectional view of the non-pneumatic tire and rim assembly having an upper cover and a lower cover as shown in FIG. 4. As can be seen from this view, the wheel 130 includes apertures 170 configured to receive the bolts 165, thus allowing the lower cover 160 to be directly attached to the wheel 130. In the illustrated embodiment, the bolts 165 extend axially into the wheel 130. In an alternative embodiment, the bolts may extend radially or at an angle. In one embodiment, the apertures 170 are threaded. In an alternative embodiment, the apertures are smooth.

A rear surface of the lower cover 160 has a circumferential groove 175 that receives the circumferential projection 150 of the upper cover 135. The lower cover 160 may be mounted to the assembly by snapping the circumferential groove 175 of the lower cover 160 onto the circumferential projection 150 of the upper cover 135, or otherwise inserting the lower circumferential projection 150 of the upper cover 135 into the circumferential groove 175 of the lower cover 160. After the lower cover 160 has been attached to the upper cover 135, the lower cover 160 may be bolted to the wheel 130.

Employing both the upper cover 135 and the lower cover 160 prevents debris from entering the openings in the non-pneumatic tire 100. Such debris could add weight to the tire and potentially damage the spokes 115 or other components. The upper cover 135 and the lower cover 160 can also protect the tire 100 from curb damage. The upper cover 135 and the lower cover 160 may also make the tire 100 more aerodynamic.

As explained above, the upper cover 135 may be constructed of a semi-flexible material, such as plastic or rubber, while the lower cover 160 is constructed of a rigid material, such as metal, polyethylene, polypropylene, glass-filled plastic, or other plastic. Thus, the upper cover 135 (whether used alone or in combination with the lower cover 160) may flex if the spokes 115 buckle or flex during rotation. The lower cover 160 (whether used alone or in combination with the upper cover 135) may function as a "bump stop" and contact the tread 125 or a road surface if the tire 100 flexes beyond a predetermined amount.

Figure 6:
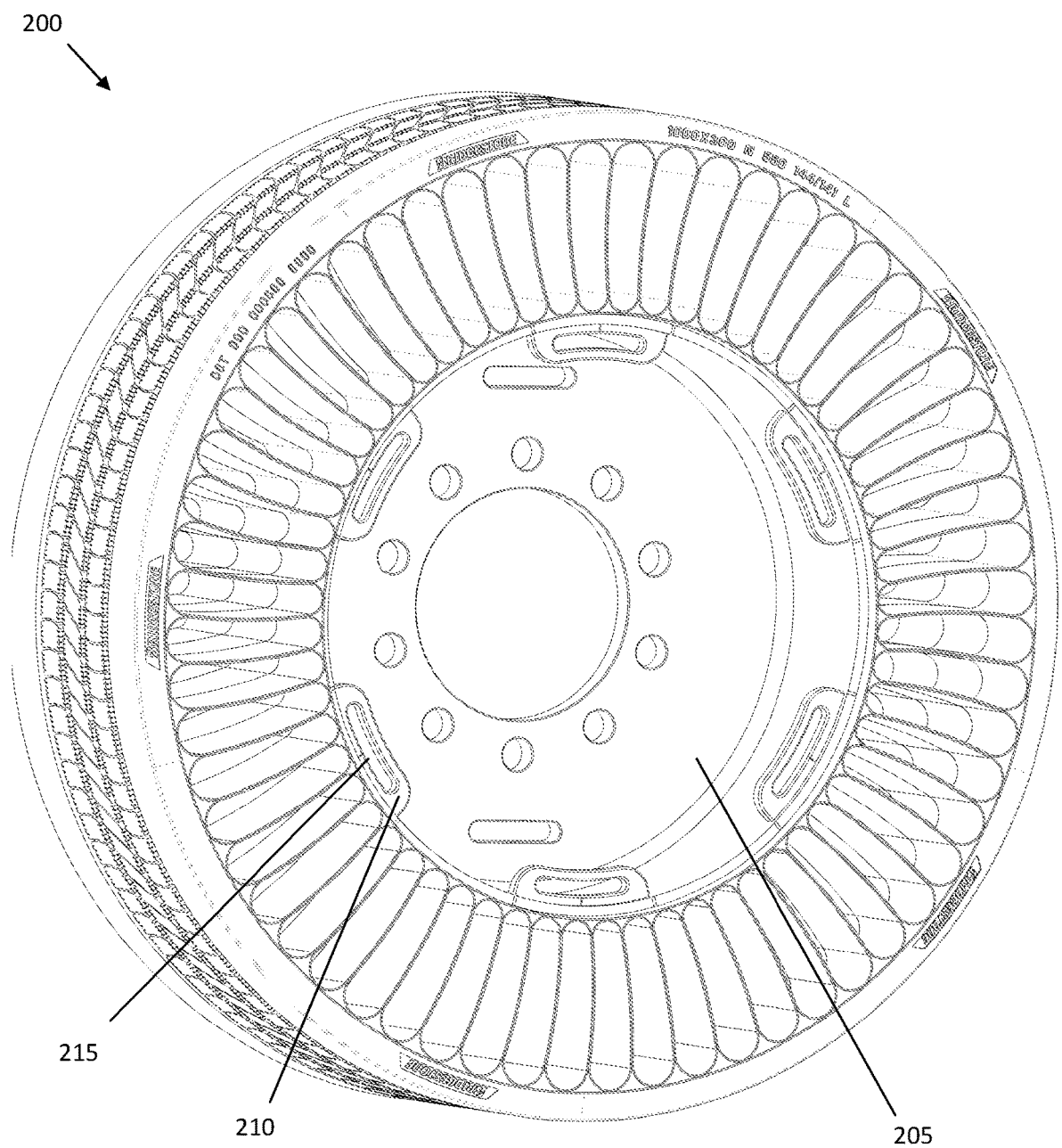
FIG. 6 is a perspective view of an alternative embodiment of a non-pneumatic tire and rim assembly.

FIG. 6 is a perspective view of an alternative embodiment of a non-pneumatic tire and rim assembly. In this embodiment, the non-pneumatic tire 200 may be substantially the same as non-pneumatic tire 100, or any of the alternative embodiments described above. Thus, the non-pneumatic tire 200 is not described in further detail.

The non-pneumatic tire 200 is mounted on a wheel 205 that has a plurality of ears 210 disposed thereon. Each of the ears 210 includes a curved slot 215. In an alternative embodiment, each ear includes a circular hole instead of a slot. While six ears are shown in the illustrated embodiment, it should be understood that any number of ears may be employed.

Figure 7:
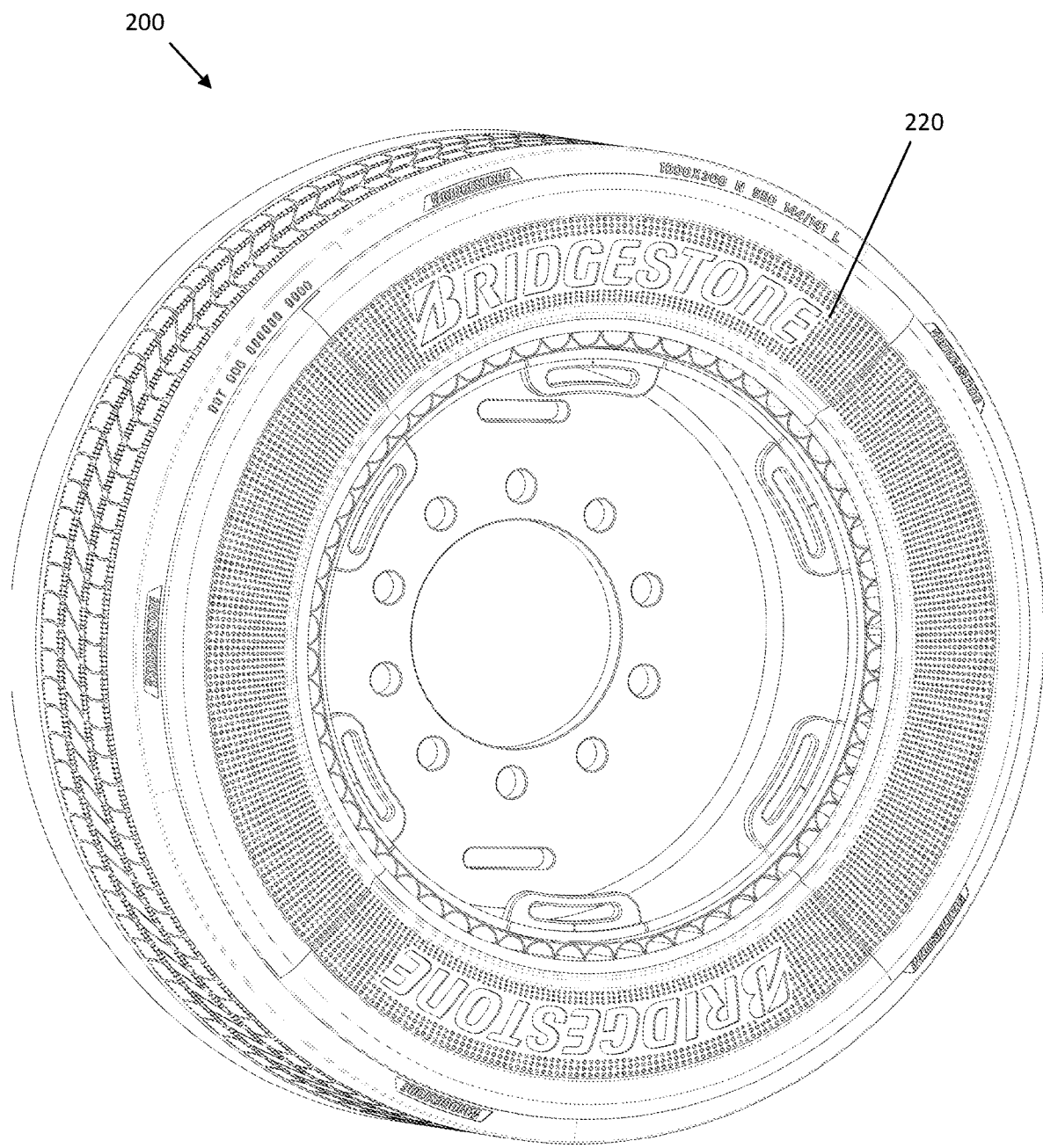
FIG. 7 is a perspective view of the non-pneumatic tire and rim assembly of FIG. 6 having an upper cover.
Figure 8:
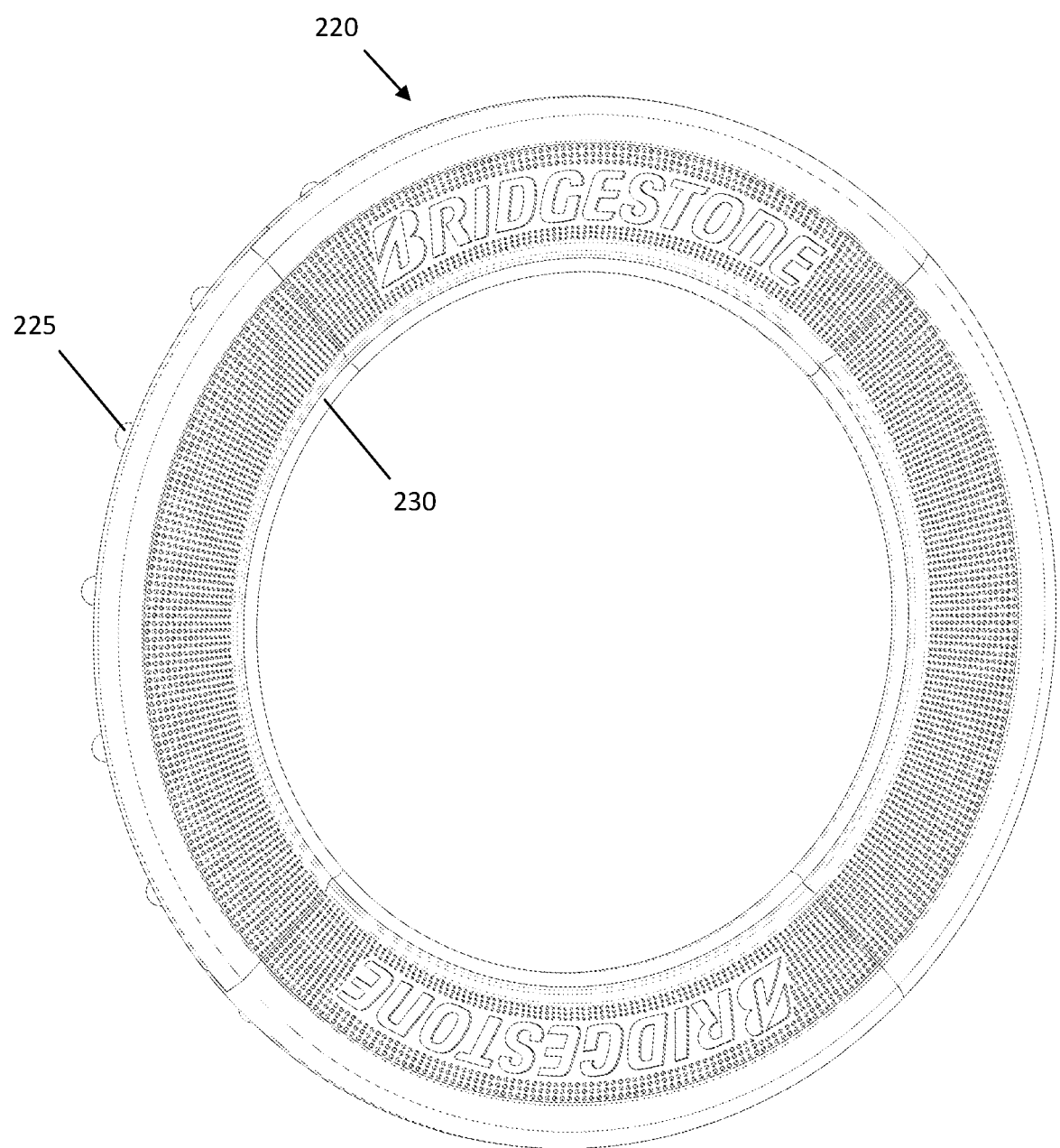
FIG. 8 is a perspective view of the upper cover of FIG. 7.

FIG. 7 is a perspective view of the non-pneumatic tire and rim assembly of FIG. 6 having an upper cover 220. FIG. 8 is a perspective view of the upper cover 220. As can be seen in this view, the upper cover 220 includes a plurality of projections 225 extending axially inward. The projections are dimensioned to fit in between the spokes of a non-pneumatic tire and may provide additional stability and prevent twisting. In one embodiment, the projections are dimensioned to provide a force fit attachment to the tire. The projections may have a textured surface or have features molded therein to increase the friction between the projections and spokes. While the projections 225 are shown as having a constant diameter, in an alternative embodiment the projections may be tapered. In an alternative embodiment, the projections have a smaller dimension such that there is a clearance between the projections and the spokes.

A lower portion of the upper cover 220 also includes a circumferential projection 230 that projects axially outward relative to a region above the circumferential projection. In the illustrated embodiment, the circumferential projection 230 of the upper cover 135 is molded into the upper cover 135. In an alternative embodiment, the circumferential projection may be defined by a lower circular wire. The circumferential projection may be a continuous projection, or may be defined by a plurality of spaced-apart projections.

Figure 9:
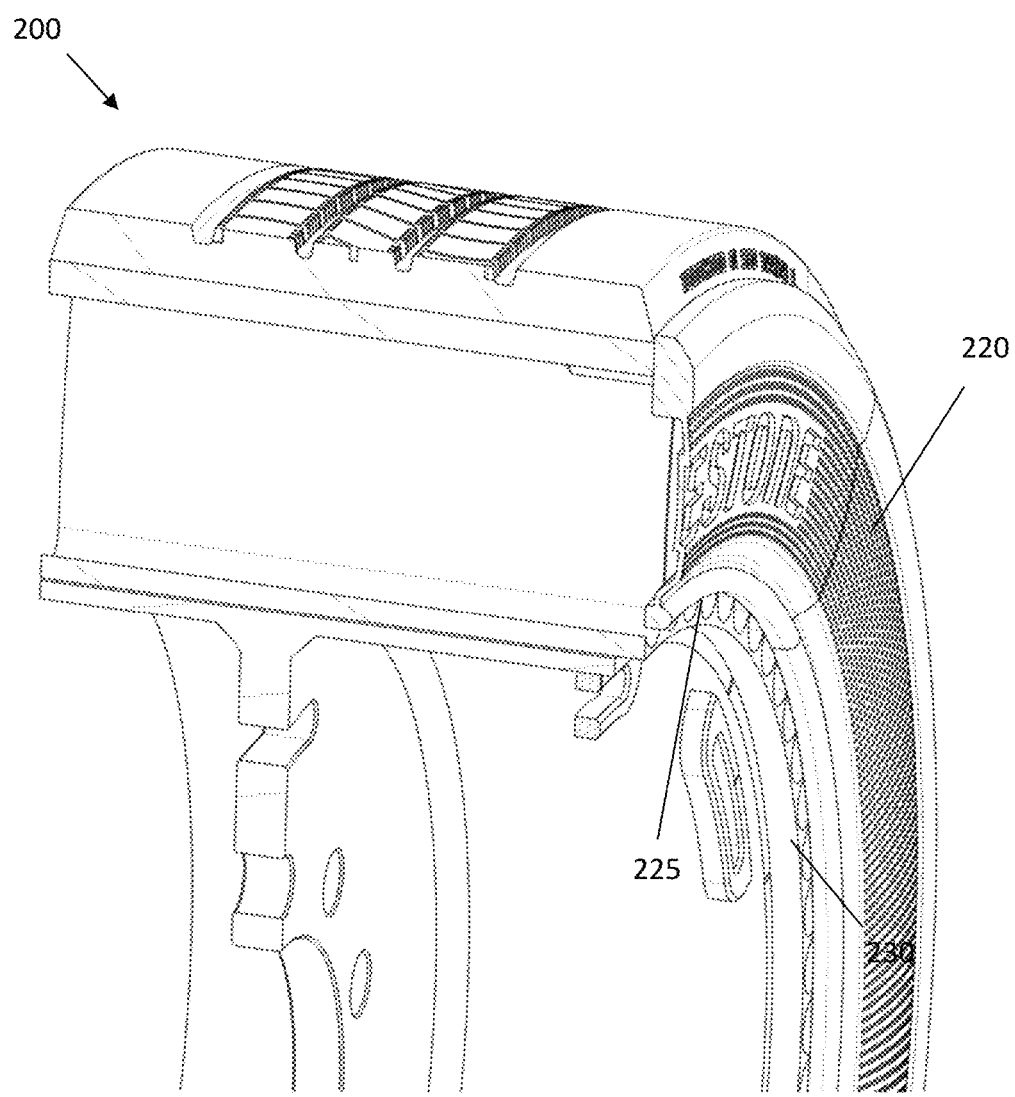
FIG. 9 is a partial cross-sectional view of the non-pneumatic tire and rim assembly having an upper cover as shown in FIG. 7.

FIG. 9 is a partial cross-sectional view of the non-pneumatic tire and rim assembly having the upper cover 220 mounted thereon. In one embodiment, the upper cover 135 is constructed of fiberglass, plastic, fabric, aramid, rubber, or other flexible material. The upper cover may be formed as a mesh, or include a plurality of apertures to increase flexibility.

Figure 10:
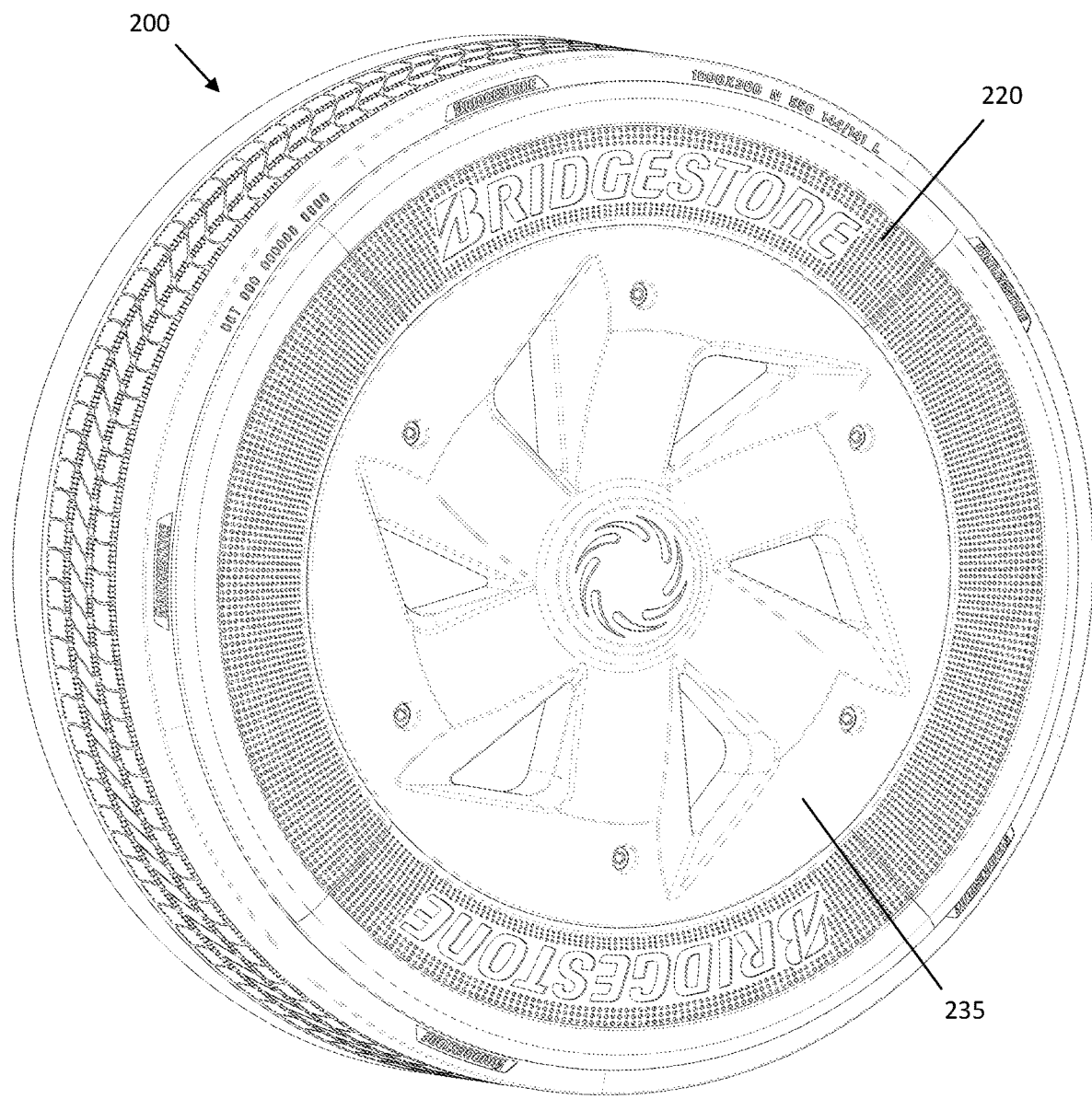
FIG. 10 is a perspective view of the non-pneumatic tire and rim assembly of FIG. 6 having an upper cover and a lower cover.

FIG. 10 is a perspective view of the non-pneumatic tire and rim assembly of FIG. 6 having the upper cover 220 and a lower cover 235. The lower cover 235 is constructed of a rigid material, such as metal, polyethylene, polypropylene, glass-filled plastic, or other plastic. While the lower cover 235 is shown as a disk in this embodiment, it may be an annulus in other embodiments.

Figure 11:
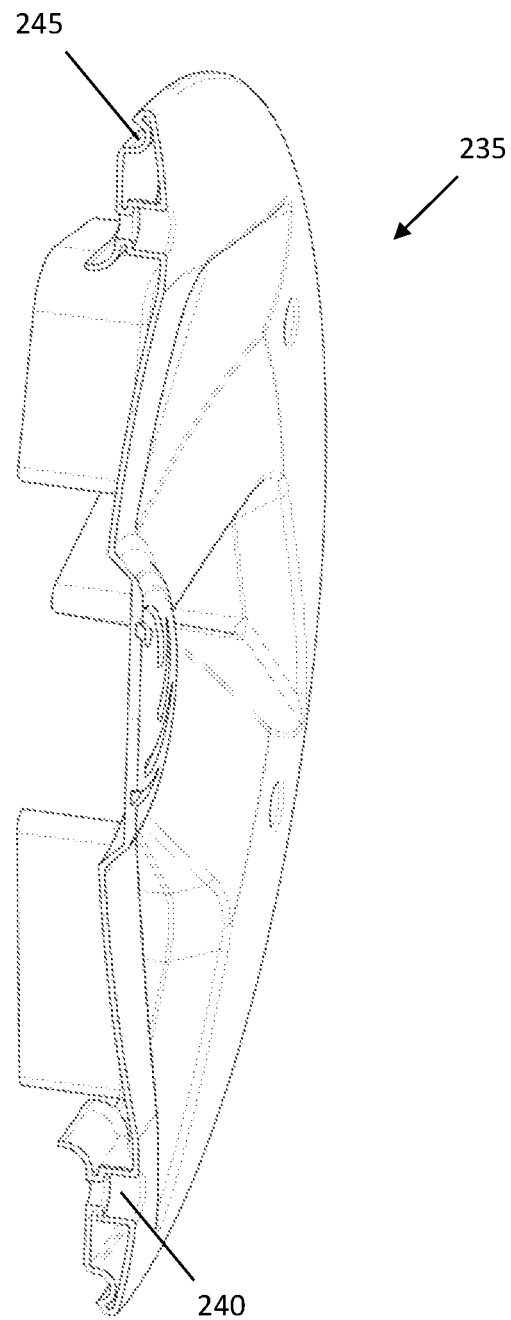
FIG. 11 is a cross-sectional view of the lower cover of FIG. 10.

FIG. 11 is a cross-sectional view of the lower cover 235. As can be seen from this view, the lower cover 235 includes a plurality of apertures 240. The lower cover 235 also has a circumferential groove 245 disposed on a rear surface.

Figure 12:
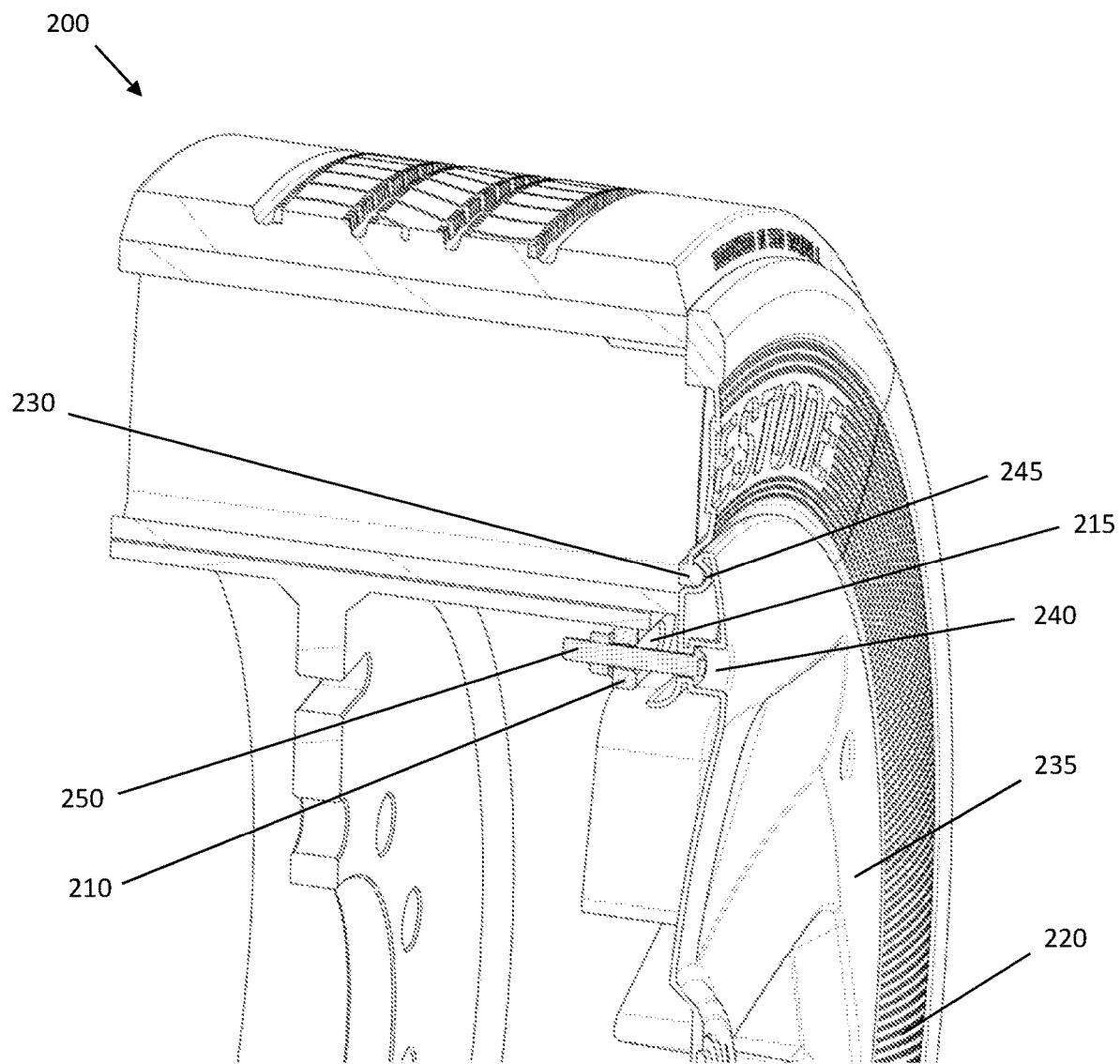
FIG. 12 is a partial cross-sectional view of the non-pneumatic tire and rim assembly with the upper cover and the lower cover as shown in FIG. 10.

FIG. 12 is a partial cross-sectional view of the non-pneumatic tire and rim assembly with the upper cover 220 and the lower cover 235 as shown in FIG. 10. As can be seen in this view, the circumferential groove 245 of the lower cover 235 receives the circumferential projection 230 of the upper cover 220. The lower cover 235 may be mounted to the assembly by snapping the circumferential groove 245 of the lower cover 235 onto the circumferential projection 230 of the upper cover 220, or otherwise inserting the lower circumferential projection 230 of the upper cover 220 into the circumferential groove 245 of the lower cover 235. After the lower cover 235 has been attached to the upper cover 220, the lower cover 235 may be bolted to the wheel 205 by passing bolts 250 through the apertures 240 of the lower cover 235 and through the slots 215 of the ears 210.

While FIGS. 1-5 illustrate an upper cover 135 in combination with a lower cover 160 and FIGS. 6-12 illustrate an upper cover 220 in combination with a lower cover 235, it should be understood that the disclosed covers, and the features of those covers are interchangeable.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

Figure 13:
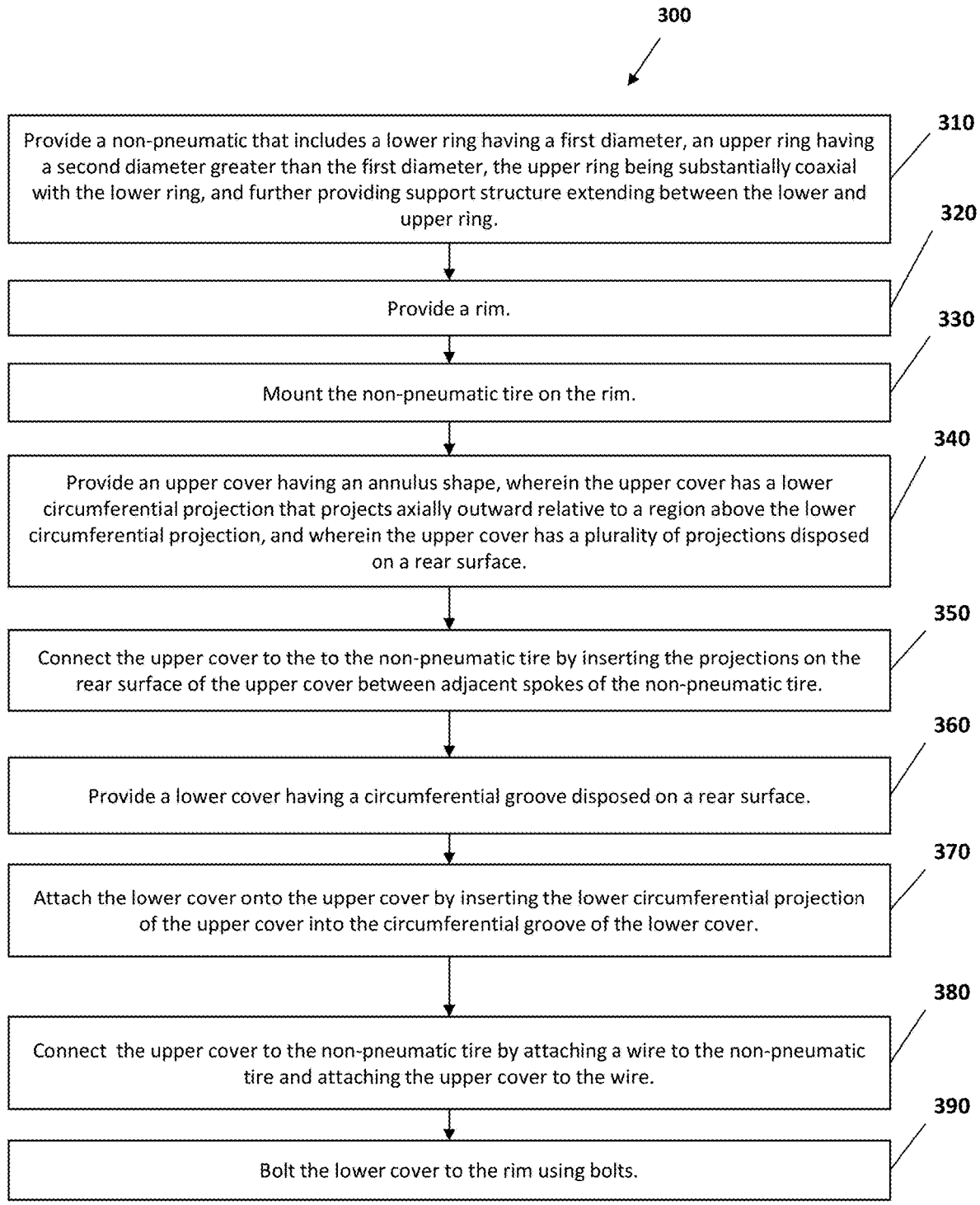
FIG. 13 is a flow chart showing one embodiment of a method of covering a side of a non-pneumatic tire.

FIG. 13 is a flowchart showing one embodiment of a method 300 of covering a side of a non-pneumatic tire. The method includes providing a non-pneumatic tire including a lower ring having a first diameter, an upper ring having a second diameter greater than the first diameter the upper ring being substantially coaxial with the lower ring, and further providing support structure extending between the lower ring and the upper ring (step 310). The method further includes providing a rim (step 320). The method further provides mounting the non-pneumatic tire on the rim (step 330). The method further includes providing an upper cover having an annulus shape, wherein the upper cover has a lower circumferential projection that projects axially outward relative to a region above the lower circumferential projection, and wherein the upper cover has a plurality of projections disposed on a rear surface (step 340). The method further includes connecting the upper cover to the non-pneumatic tire by inserting the projections on the rear surface of the upper cover between adjacent spokes of the non-pneumatic tire (step 350). The method further includes providing a lower cover having a circumferential groove disposed on a rear surface (step 360). The method further includes attaching the lower cover onto the upper cover by inserting the lower circumferential projection of the upper cover into the circumferential groove of the lower cover (step 370). The method further includes connecting the upper cover to the non-pneumatic tire by attaching a wire to the non-pneumatic tire and attaching the upper cover to the wire (step 380). The method further incudes bolting the lower cover to the rim with bolts (step 390).

What is claimed is:

1. A non-pneumatic tire, wheel rim, and cover assembly, the assembly comprising:
   a non-pneumatic tire including:
      a lower ring having a first diameter,
      an upper ring having a second diameter greater than the first diameter, the upper ring being substantially coaxial with the lower ring, and
      a support structure extending between the lower ring and the upper ring;
   a wheel rim connected to the lower ring of the non-pneumatic tire;
   an upper cover connected to a first side of the non-pneumatic tire,
      wherein the upper cover has an annulus shape that covers at least a portion of the support structure,
      wherein a lower portion of the upper cover includes a circumferential projection that projects axially outward relative to a region above the circumferential projection; and
   a lower cover connected to the upper cover, wherein the lower cover has a circumferential groove disposed on a rear surface that receives the circumferential projection of the upper cover.

2. The assembly of claim 1, wherein the upper cover is attached to the non-pneumatic tire at a plurality of locations.

3. The assembly of claim 1, further comprising a circular wire attached to the non-pneumatic tire, wherein the upper cover is attached to the circular wire.

4. The assembly of claim 1, wherein the circumferential projection of the upper cover is defined by a wire.

5. The assembly of claim 1, wherein the upper cover is constructed of a flexible material.

6. The assembly of claim 1, wherein the lower cover is attached directly to the wheel rim.

7. The assembly of claim 1, wherein the lower cover is attached to at least one connector that is attached directly to the wheel rim.

8. The assembly of claim 1, wherein the lower cover has a front face that is a disk.

9. The assembly of claim 1, wherein the lower cover has a front face that is an annulus.

10. A method of covering a side of a non-pneumatic tire, the method comprising:
providing a non-pneumatic tire including:
a lower ring having a first diameter,
an upper ring having a second diameter greater than the first diameter, the upper ring being substantially coaxial with the lower ring, and
a support structure extending between the lower ring and the upper ring;
providing a wheel rim;
mounting the non-pneumatic tire on the wheel rim;
providing an upper cover having an annulus shape, wherein the upper cover has a lower circumferential projection that projects axially outward relative to a region above the lower circumferential projection;
connecting the upper cover to the non-pneumatic tire;
providing a lower cover having a circumferential groove disposed on a rear surface; and
attaching the lower cover onto the upper cover by inserting the lower circumferential projection of the upper cover into the circumferential groove of the lower cover.

11. The method of claim 10, wherein the support structure includes a plurality of spokes, wherein the upper cover includes a plurality of projections disposed on a rear surface, and wherein the connecting of the upper cover to the non-pneumatic tire includes inserting the projections of the upper cover between adjacent spokes of the non-pneumatic tire.

12. The method of claim 10, wherein the connecting of the upper cover to the non-pneumatic tire includes attaching a wire to the non-pneumatic tire and attaching the upper cover to the wire.

13. The method of claim 10, further comprising bolting the lower cover to the wheel rim with axially extending bolts.

14. The method of claim 10, further comprising bolting the lower cover to the wheel rim with bolts.

15. A non-pneumatic tire having a cover, the non-pneumatic tire comprising:
a lower ring having a first diameter;
an upper ring having a second diameter greater than the first diameter, the upper ring being substantially coaxial with the lower ring;
a support structure extending between the lower ring and the upper ring;
a flexible cover having an annulus shape that covers at least only a portion of a first side of the support structure, not the entire first side of the support structure,
wherein a lower portion of the flexible cover includes a circumferential projection that projects axially outward relative to a region above the circumferential projection.

16. The non-pneumatic tire of claim 15, wherein the circumferential projection is defined by a circumferential wire.

17. The non-pneumatic tire of claim 15, wherein the circumferential projection is molded into the flexible cover.

18. The non-pneumatic tire of claim 15, further comprising a rigid cover configured to snap onto the circumferential projection.

19. The non-pneumatic tire of claim 15, wherein the support structure includes a plurality of spokes.

* * * * *